(12) United States Patent
Saito

(10) Patent No.: US 7,496,949 B2
(45) Date of Patent: Feb. 24, 2009

(54) NETWORK SYSTEM, PROXY SERVER, SESSION MANAGEMENT METHOD, AND PROGRAM

(75) Inventor: Tsuguharu Saito, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/592,188

(22) Filed: Nov. 3, 2006

(65) Prior Publication Data

US 2007/0067834 A1    Mar. 22, 2007

(30) Foreign Application Priority Data

Apr. 11, 2005 (JP) .............................. 2005-321316

(51) Int. Cl.
*H04L 9/32* (2006.01)
*G06F 15/16* (2006.01)

(52) U.S. Cl. ................................. 726/2; 726/3; 726/12

(58) Field of Classification Search ................ 726/2–3, 726/12; 713/168–170
See application file for complete search history.

(56) References Cited

U.S. PATENT DOCUMENTS

| 6,298,380 | B1 * | 10/2001 | Coile et al. ................. 709/227 |
| 7,133,904 | B1 | 11/2006 | Sohya et al. |
| 2003/0163569 | A1 | 8/2003 | Panasyuk et al. |
| 2003/0182437 | A1 | 9/2003 | Kobayashi et al. |
| 2004/0117489 | A1 * | 6/2004 | Harmon et al. ............. 709/229 |
| 2004/0168054 | A1 * | 8/2004 | Halasz et al. ............... 713/155 |
| 2004/0225897 | A1 * | 11/2004 | Norton ....................... 713/201 |
| 2006/0031442 | A1 * | 2/2006 | Ashley et al. ............... 709/223 |

FOREIGN PATENT DOCUMENTS

| JP | 2001-142768 A | 5/2001 |
| JP | 2002-259338 A | 9/2002 |
| JP | 2003-256321 A | 9/2003 |
| WO | WO-2005/036857 | 4/2005 |

* cited by examiner

*Primary Examiner*—Hosuk Song
(74) *Attorney, Agent, or Firm*—Foley & Lardner LLP

(57) ABSTRACT

The present invention provides a network system, a proxy server, a session management method, and a program which enable to maintain sessions securely by managing the sessions in the proxy server. The network system includes a client, a proxy server, and at least two web servers which are connected to each other via a communication network. The proxy server includes a session management means for maintaining sessions of the at least two web servers. Upon receiving a predetermined request from an authenticated user, the session management means associates and stores user information indicating a user of the client, server information indicating a subject web server of the request, and session information received from the web server.

28 Claims, 3 Drawing Sheets

FIG. 2

SESSION MANAGEMENT FUNCTION 30

| USER INFORMATION | SERVER INFORMATION | SESSION INFORMATION |
|---|---|---|
| USER 1 | SERVER A<br>SERVER B | Sessionxxx1<br>BSessionxxx2 |
| USER 2 | SERVER C | serverCSession3 |
| ⋮ | | |

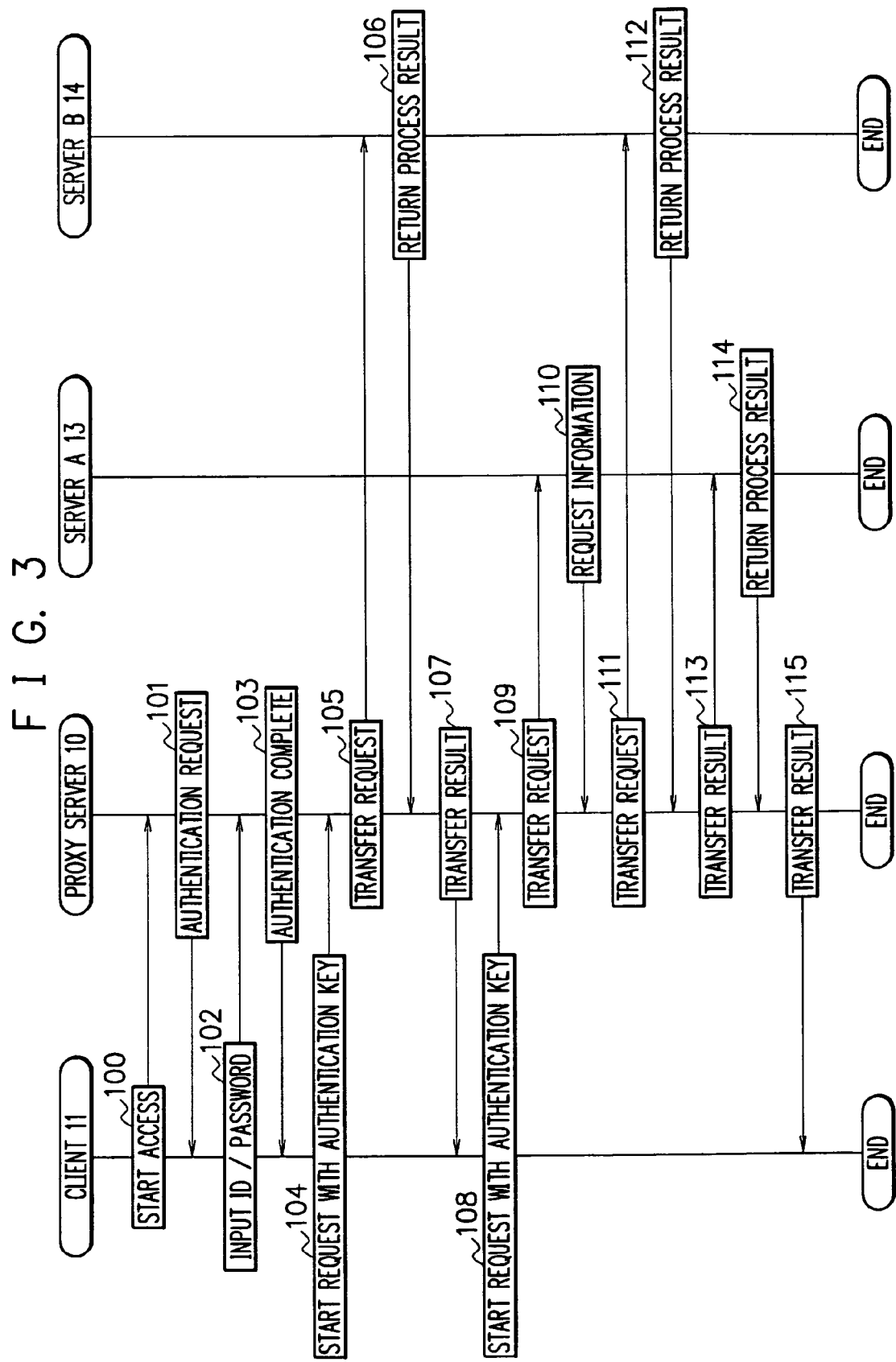

NETWORK SYSTEM, PROXY SERVER, SESSION MANAGEMENT METHOD, AND PROGRAM

BACKGROUND OF THE INVENTION

1. Field of the Invention

The present invention relates to a network system, a proxy server, a session management method, and a program for communications using an active proxy.

2. Description of the Related Art

Conventionally, in case of communications using an active proxy, it is needed to maintain sessions by, for example, adding session information to a destination address. However, in this method, since a server is required to add the session information to a destination address, there is a risk that the session information may be easily leaked to other servers and a session may be stolen. Further, there is a problem that such a method cannot be applied to a case where communication is performed by using a different server within a series of sessions.

Further, among the Liberty Alliance specifications, a specification called LECP profile has the similar problem and it is difficult to realize such a specification, especially, in a session management method using cookies.

As examples of the related art of a proxy server, there are "system including proxy server and web server and program therefor" in which, when a web server in a coverage area does not return response information, a web client is informed the reason why the web server is stopped and estimated time for restarting, instead of a conventional error return (see, for example, Japanese Patent Application Laid-Open No. 2002-259338) and "proxy server and proxy control system" which suppress effects on other traffics in a network when obtaining content from an origin server (see, for example, Japanese Patent Application Laid-Open No. 2003-256321).

SUMMARY OF THE INVENTION

The present invention has been developed in view of the above problems and has an object of providing a network system, a proxy server, a session management method, and a program which enable to maintain sessions completely by managing sessions in a proxy server.

In order to achieve the above object, the first aspect of the invention is a network system, including a client, a proxy server, and at least two web servers. The client and the proxy server, and the at least two web servers are connected to each other via a communication network, and the proxy server includes a session management means for maintaining a session of the at least two web servers.

The second aspect of the invention is the network system in which, upon receiving a predetermined request from an authenticated client, the session management means stores user information of the client, server information indicating a target web server of the request, and session information received from the web server and associates them each other.

The third aspect of the invention is the network system in which the proxy server includes a user authentication means for carrying out user authentication of the client based on identification information received from the client, and the session management means stores, as the user information, the user authenticated by the user authentication means.

The fourth aspect of the invention is the network system in which the session management means stores, as the user information, an IP address received from the client.

The fifth aspect of the invention is the network system, further including an authentication server for carrying out user authentication of the client and informing the proxy server of an authentication result. The session management means stores, as the user information, the user authenticated by the authentication server.

The sixth aspect of the invention is the network system, in which the proxy server includes a protocol conversion means for converting a current protocol in use into another protocol.

The seventh aspect of the invention is the network system in which the proxy server includes a security means for authenticating the client and the web server.

The eighth aspect of the invention is a proxy server for proxy receiving in response to a request addressed to a predetermined web server from a client, in which a session management means for maintaining a session of the web server is included.

The ninth aspect of the invention is the proxy server in which, upon receiving a predetermined request from an authenticated client, the session management means associates and stores user information of the client, server information indicating a subject web server of the request, and session information received from the web server.

The tenth aspect of the invention is the proxy server in which the proxy server includes a user authentication means for carrying out user authentication of the client based on identification information received from the client, and the session management means stores, as the user information, the user authenticated by the user authentication means.

The eleventh aspect of the invention is the proxy server in which the session management means stores, as the user information, an IP address received from the client.

The twelfth aspect of the invention is the proxy server, further including an authentication server for carrying out user authentication of the client and informing the proxy server of an authentication result. The session management means stores, as the user information, the user authenticated by the authentication server.

The thirteenth aspect of the invention is the proxy server, further including a protocol conversion means for converting a current protocol in use into another protocol.

The fourteenth aspect of the invention is the proxy server, further including a security means for authenticating the client and the web server.

The fifteenth aspect of the invention is a session management method, in which a proxy server for proxy receiving a request addressed to a predetermined web server from a client maintains a session of the web server.

The sixteenth aspect of the invention is the session management method in which, upon receiving a predetermined request from an authenticated client, the proxy server associates and stores user information of the client, server information indicating a subject web server of the request, and session information received from the web server.

The seventeenth aspect of the invention is the session management method in which the proxy server carries out user authentication of the client based on identification information received from the client and stores the authenticated user as the user information.

The eighteenth aspect of the invention is the session management method in which an IP address received from the client is stored as the user information.

The nineteenth aspect of the invention is the session management method, further including storing, as the user information, a user authenticated by an authentication server, which carries out user authentication of the client and informs the proxy serve of an authentication result.

The twentieth aspect of the invention is the session management method in which the proxy server converts a current protocol in use into another protocol.

The twenty first aspect of the invention is the session management method in which the proxy server authenticates the client and the web server.

The twenty second aspect of the invention is a computer program product, when executed, causing a proxy server to carry out a session management process for maintaining a session in a web server.

The twenty third aspect of the invention is the computer program product in which, in the session management process, upon receiving a predetermined request from an authenticated client, the proxy server is made to associate and store user information of the client, server information indicating a subject web server of the request, and session information received from the web server.

The twenty fourth aspect of the invention is the computer program product in which the proxy server is made to carry out a user authentication process for authenticating the client based on identification information received from the client, and in the session management process, the proxy server is made to store, as the user information, the user authenticated in the user authentication process.

The twenty fifth aspect of the invention is the computer program product in which, in the session management process, the proxy server is made to carry out a process for storing, as the user information, an IP address received from the client.

The twenty sixth aspect of the invention is the computer program product in which, in the session management process, the proxy server is made to carry out a process to store, as the user information, a user authenticated by an authentication server, which carries out user authentication of the client and informs the proxy server of an authentication result.

The twenty seventh aspect of the invention is the computer program product in which the proxy server is made to carry out a protocol conversion process for converting a current protocol in use into another protocol.

The twenty eighth aspect of the invention is the computer program product in which, the proxy server is made to carry out a security process for authenticating the client and the web server.

According to the present invention, sessions can be maintained securely even when a proxy server actively accesses to a plurality of servers.

BRIEF DESCRIPTION OF THE DRAWINGS

FIG. 2 is a view showing a session management function of a proxy server according to the first embodiment of the present invention; and FIG. 3 is a sequence diagram showing an operation according to the first embodiment of the present invention.

DESCRIPTION OF THE PREFERRED EMBODIMENTS

Figure 1:
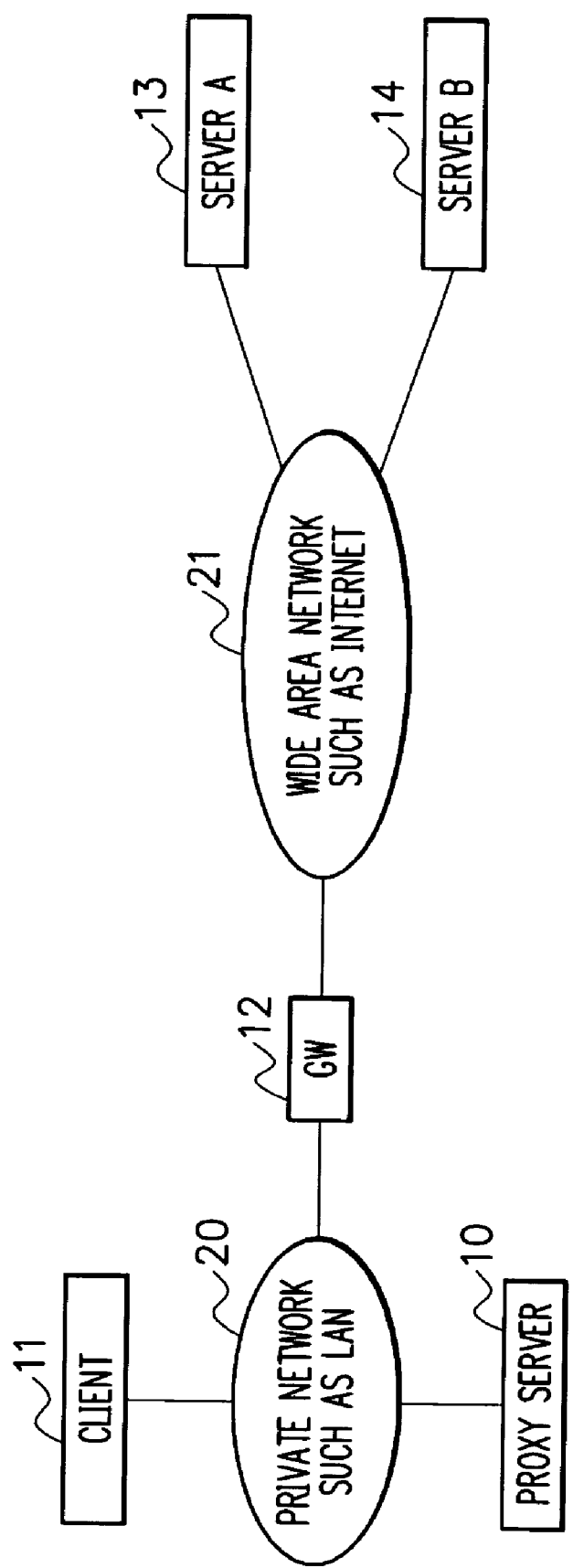
FIG. 1 is a view showing a structure of a network system according to the first embodiment of the present invention.

Preferred embodiments for realizing the present invention will be described with reference to the accompanying drawings.

First Embodiment

As shown in FIG. 1, in a network system according to the first embodiment of the present invention, a private network 20 such as a LAN, a proxy server 10 connected to the private network 20, and a client terminal device (hereinafter, referred to as "client") 11, which is a typical information processing terminal device such as a personal computer and is connected to the private network 20, are connected to a wide area network 21 such as the Internet via a GW (gateway) 12. In addition, the wide area network 21 is connected to a server A13 and a server B14.

In the first embodiment, a case where the client 11 accesses the server A13 and the server B14 via the proxy server 10 acting as a proxy will be considered with reference to FIG. 1. In this system, there are two or more servers to be accessed.

The proxy server 10 of the present embodiment is configured to receive a request from the client 11 and access to the server A13.

The proxy server 10 includes a session management function 30 for authenticating a user of the client 11, identifying the user of the client 11, and storing user information indicating the identified user associated with session information of the server A13. As shown in FIG. 2, the session management function 30 is configured to store user information indicating the user of the client 11, server information indicating a request target server, and session information of the request target server together.

The proxy server 10 is configured to extract the session information of the request target server from the session management function 30 based on the session information related to the request target server in response to a request from the user of the client 11 and add the session information to the request from the client 11.

The proxy server 10 is configured to add information indicating that the access to the server A13 is carried out via a proxy.

When receiving a request addressed to the server B14 from the server A13, the proxy server 10 is configured to transfer a request received from the server A13 to the server B14.

The proxy server 10 is configured to transfer a response addressed to the server A13 from the server B14 to the server A13.

The client 11 is configured to transmit a request to a predetermined server via the proxy server 10 and receive information from the predetermined server. Here, the client 11 is configured to transmit user's input to the request source server when a request of, for example, authentication is inputted.

The server A13 and the server B14 are typical web servers and configured to receive a request from the client 11 and transmit a response according to the request.

When the request includes information that the access is carried out via the proxy, the server A13 returns to the proxy server 10 information that a request is to be sent to the server B14.

The server B14 is configured to receive the request from the server A13, which is transmitted via the proxy server 10, and return information according to the request.

An operation (session management method and program) of the first embodiment of the present invention will be described in detail with reference to FIG. 3.

According to the present embodiment, access to the server B14 is implemented after the proxy server 10 authenticates the user of the client 11. The content of the access is not particularly limited. In this example, a user authentication is carried out. After the user authentication, a request for confidential information is sent to the server A13. Here, when the request for confidential information is transferred via the proxy, the server A13 checks whether the user of the client 11 as a request source is authenticated by the server B14. When the server A13 confirms that the user of the client 11 is authenticated by the server B14, the server A13 transmits the confidential information to the client 11.

First, the client 11 accesses the proxy server 10 (step S100). Then, the proxy server 10 requests the client 11 a user authentication (step S101).

The user of the client 11 inputs identification information such as an ID and a password, the identification information being previously registered to the proxy server 10, and transmits the information to the proxy server 10 (step S102). Here, this authentication method is not limited to an ID and a password and may employ conventional authentication methods.

The proxy server 10 confirms (authenticates) the ID and the password transmitted from the client 11 in step S102 and transmits an authentication key that indicates the completion of the authentication to the client 11 (step 103).

The client 11 transmits an authentication request addressed to the server B14 to the proxy server 10 with the authentication key transmitted in step S103 (step S104).

After confirming the authentication key, the proxy server 10 transfers the request from the client 11 to the server B14 (step S105).

When receiving the authentication request of the client 11 transferred by the proxy server 10, the server B14 authenticates and then returns an authentication result and session information (step S106).

The proxy server 10 associates the session information returned from the server B14 with information of the user of the client 11 and the server B14 and registers them to the session management function 30. In addition, the proxy server 10 transfers the authentication result returned from the server B14 to the client 11 (step S107).

After the client 11 confirms that the authentication is completed in the server B14 according to the authentication result, the client 11 transmits a confidential information request addressed to the server A13 to the proxy server 10 together with the authentication key transmitted in step S103 (step S108).

After confirming the authentication key, the proxy server 10 transfers the request from the client 11 to the server A13. Further, when transferring, the proxy server 10 adds information that the access is carried out via a proxy to the request (step S109).

The server A13 receives the request of the client 11 transferred by the proxy server 10. Here, based on the information that the confidential information is requested and the access is carried out via a proxy, the server A13 transmits to the proxy server 10 a request for authentication confirmation addressed to the server B14 (step S110).

When receiving the request for authentication confirmation addressed to the server B14 and session information of the server A13 from the server A13, the proxy server 10 associates the session information of the server A13 with the information of the user of the client 11 and the server A13 to register them to the session management function 30 and to extract the session information of the user of the client 11 and the server B14 from the session management function 30. The proxy server 10 transfers the request for authentication confirmation addressed to the server B14 from the server A13 and the session information of the server B14 extracted from the session management function 30 to the server B14 (step S111).

The server B14 confirms that the received session information is of the user authenticated in step S106 and returns a result that the user is authenticated (step S112).

The proxy server 10 transfers the result returned in step S112 to the server A13 together with the session information of the server A13 extracted from the session management function 30 (step S113).

The server A13 recognizes it as a response to the request for authentication confirmation that was addressed to the server B14 requested in step 110 based on the session information and returns the confidential information to the proxy server 10 (step S114).

The proxy server 10 transfers the response from the server A13 to the client 11 (step S115).

As described above, according to the session management method with the proxy server by controlling program in the network system of the present embodiment, the client 11 can receive the confidential information from the server A13 while the sessions are maintained in an active proxy.

In other words, according to the present embodiment, sessions can be maintained in the sequence shown in FIG. 3 although it was impossible in a normal session management by a client. This is because a conventional proxy server which does not perform session management can not recognize that the request in step S105 and the request in step S111 in FIG. 3 are requests transmitted from the same client. This happens because the request is addressed to the server B14 in the step S104 and the request is addressed to the server A13 in step S108.

Further, according to the present embodiment, a plurality of servers can work in cooperation. In step S110 in FIG. 3, the authentication is confirmed for the server B14; however, requests should not be used only for authentications. Here, since the servers do not directly communicate with each other, the range where the information is transferred can be controlled. According to the first embodiment, the server A13 is adapted to authenticate the client 11 without using the authentication information of the client 11.

Second Embodiment

The second embodiment of the present invention employs an IP address for identification of the client 11 in a session management function 30 although the first embodiment employs an authentication in proxy server 10. In this case, comparing to the first embodiment, the processes in steps S100 to S103 can be omitted and an IP address is used as an identifier for registering with and obtaining from the session management function 30.

Third Embodiment

The third embodiment of the present invention shows a case where the client 11 is a mobile telephone. In this case, comparing to the first embodiment, the private network 20 such as a LAN in FIG. 1 is a mobile telephone communication network and an authentication server such as a WAP server is provided in addition to the proxy server 10. Here, a user authentication is performed in the WAP server, and a telephone number or the like can be used as an identifier to identify the client 11.

In addition, according to the third embodiment, a private network 20 such as a LAN or a GW 12 is not required, so even when the client 11 and the proxy server 10 are located in a wide area network 21 such as the Internet, they can be used in the same way.

Fourth Embodiment

In the fourth embodiment of the present invention, additional functions are provided to the proxy server 10. A protocol conversion function or a security function is added to the proxy server 10 as an additional function. The protocol conversion function enables accesses using protocols other than an IP for an ISDN dedicated network that is not the Internet. Further, the security function enables an authentication of a client or a server by using, for example, an SSL (Secure Sockets Layer) communication function so that session management can be performed similar to the first embodiment.

Although embodiments of the present invention are explained above, the invention should not be limited to the above embodiments and can be carried out with modifications within the scope of the present invention. The present invention may be applied to service interactions, authentication interactions, and Web systems.

What is claimed is:

1. A network system, comprising:
   a client;
   a proxy server that is connected to the client; and
   a server and an authentication server,
   wherein the client and the proxy server, and the server and the authentication server are connected to each other via a communication network, and
   the proxy server includes:
   a storing unit configured to store session information on an authentication process between the client terminal and the authentication server;
   a receiving unit configured to receive a request for access to the server from the client terminal;
   a transmitting unit configured to transmit the request for access to the server; and
   an identifying unit configured to:
   identify, when receiving from the server a request for authentication to the authentication server, the request for access corresponding to the request for authentication in accordance with the request for authentication;
   identify the client terminal which transmits the identified request for access in accordance with the identified request for access; and
   identify, from the stored session information, session information between the identified client terminal and the authentication server which is requested the request for authentication;
   wherein the transmitting unit is configured to transmit the identified session information to the authentication server.

2. The network system according to claim 1,
   wherein upon receiving a predetermined request from an authenticated client, the session management means associates and stores user information of the client, server information indicating a target web server of the request, and session information received from the web server.

3. The network system according to claim 2,
   wherein the proxy server includes a user authentication means for carrying out authentication of a user of the client based on identification information received from the client, and
   the session management means stores the user authenticated by the user authentication means as the user information.

4. The network system according to claim 2,
   wherein the session management means stores, as the user information, an IP address received from the client.

5. The network system according to claim 2, further comprising an authentication server for carrying out authentication of a user of the client and informing the proxy server of an authentication result,
   wherein the session management means stores, as the user information, the user authenticated by the authentication server.

6. The network system according to claim 1,
   wherein the proxy server includes a protocol conversion means for converting a current protocol in use into another protocol.

7. The network system according to claim 1,
   wherein the proxy server includes a security means for authenticating the client and the web server.

8. A proxy server that is connected to a client terminal, a server and an authentication server, comprising:
   a storing unit configured to store session information on an authentication process between the client terminal and the authentication server;
   a receiving unit configured to receive a request for access to the server from the client terminal;
   a transmitting unit configured to transmit the request for access to the server;
   an identifying unit configured to:
   identify, when receiving from the server a request for authentication to the authentication server, the request for access corresponding to the request for authentication in accordance with the request for authentication;
   identify the client terminal which transmits the identified request for access in accordance with the identified request for access; and
   identify, from the stored session information, session information between the identified client terminal and the authentication server which is requested the request for authentication; and
   wherein the transmitting unit is configured to transmit the identified session information to the authentication server.

9. The proxy server according to claim 8,
   wherein upon receiving a predetermined request from an authenticated client, the session management means stores user information of the client, server information indicating a subject web server of the request, and session information received from the web server, and associates the three kinds of information each other.

10. The proxy server according to claim 9,
    wherein the proxy server includes a user authentication means for carrying out authentication of a user of the client based on identification information received from the client, and
    the session management means stores, as the user information, the user authenticated by the user authentication means.

11. The proxy server according to claim 9,
    wherein the session management means stores, as the user information, an IP address received from the client.

12. The proxy server according to claim 9, further comprising an authentication server for carrying out authentication of a user of the client and informing the proxy server of an authentication result,
    wherein the session management means stores, as the user information, the user authenticated by the authentication server.

13. The proxy server according to claim 8, further comprising a protocol conversion means for converting a current protocol into another protocol.

14. The proxy server according to claim 8, further comprising a security means for authenticating the client and the web server.

15. A session management method, wherein a proxy server is connected to a client terminal, a server and an authentication server, comprising the steps of:
   storing session information on an authentication process between the client terminal and the authentication server;
   receiving a request for access to the server from the client terminal;
   transmitting the request for access to the server;
   identifying, when receiving from the server a request for authentication to the authentication server, the request for access corresponding to the request for authentication in accordance with the request for authentication;
   identifying the client terminal which transmits the identified request for access in accordance with the identified request for access;
   identifying, from the stored session information, session information between the identified client terminal and the authentication server which is requested the request for authentication; and
   transmitting the identified session information to the authentication server.

16. The session management method according to claim 15,
   wherein upon receiving a predetermined request from an authenticated client, the proxy server stores user information of the client, server information indicating a subject web server of the request, and session information received from the web server, and associates the three kinds of information each other.

17. The session management method according to claim 16,
   wherein the proxy server carries out authentication of a user of the client based on identification information received from the client and stores the authenticated user as the user information.

18. The session management method according to claim 16,
   wherein an IP address received from the client is stored as the user information.

19. The session management method according to claim 16, further comprising storing, as the user information, a user authenticated by an authentication server, which carries out user authentication of the client and informs the proxy server of an authentication result.

20. The session management method according to claim 15, wherein the proxy server converts a protocol currently in use into another protocol.

21. The session management method according to claim 15, wherein the proxy server authenticates the client and the web server.

22. A computer program product, embodied in a computer readable medium, when executed, causing a proxy server that is connected to a client terminal, a server and an authentication server, to:
   store session information on an authentication process between the client terminal and the authentication server;
   receive a request for access to the server from the client terminal;
   transmit the request for access to the server;
   identify, when receiving from the server a request for authentication to the authentication server, the request for access corresponding to the request for authentication in accordance with the request for authentication;
   identify the client terminal which transmits the identified request for access in accordance with the identified request for access;
   identify, from the stored session information, session information between the identified client terminal and the authentication server which is requested the request for authentication; and
   transmit the identified session information to the authentication server.

23. The computer program product, embodied in a computer readable medium, according to claim 22, causing a proxy server to store user information of the client, server information indicating a subject web server of the request, and session information received from the web server, and associates the three kinds of information each other, upon receiving a predetermined request from an authenticated client within the session management process.

24. The computer program product, embodied in a computer readable medium, according to claim 23, causing the proxy server to carry out a user authentication process for authenticating the client based on identification information received from the client, and
   causing the proxy server to store, as the user information, the user authenticated in the user authentication process within the session management process.

25. The computer program product, embodied in a computer readable medium, according to claim 23, causing the proxy server to carry out a process for storing, as the user information, an IP address received from the client.

26. The computer program product, embodied in a computer readable medium, according to claim 23, causing, within the session management process, the proxy server to carry out a process to store, as the user information, a user authenticated by an authentication server, which carries out authentication of a user of the client and informs the proxy server of an authentication result.

27. The computer program product, embodied in a computer readable medium, according to claim 22, causing the proxy server to carry out a protocol conversion process for converting a current protocol into another protocol.

28. The computer program product, embodied in a computer readable medium, according to claim 22, causing the proxy server to carry out a security process for authenticating the client and the web server.

* * * * *